United States Patent [19]
Jaye

[11] Patent Number: 5,894,826
[45] Date of Patent: Apr. 20, 1999

[54] COMBUSTION CHAMBER FOR DIRECT INJECTION OF FUEL INTO EXHAUST RECIRCULATION RICH MIXTURE

[75] Inventor: John R. Jaye, Northville, Mich.

[73] Assignee: Chrysler Corporation, Auburn Hills, Mich.

[21] Appl. No.: 08/979,528

[22] Filed: Nov. 26, 1997

[51] Int. Cl.$^6$ .................. F02B 31/00; F02B 17/00; F02B 3/02
[52] U.S. Cl. .................. 123/295; 123/299; 123/301; 123/302; 123/305; 123/310
[58] Field of Search .................. 123/295, 299, 123/301, 302, 305, 308, 310

[56] References Cited

U.S. PATENT DOCUMENTS

| | | | |
|---|---|---|---|
| 5,335,635 | 8/1994 | Kadoi et al. | 123/295 |
| 5,529,038 | 6/1996 | Tsuchida | 123/305 |
| 5,603,299 | 2/1997 | Yuzuriha et al. | 123/308 |
| 5,765,525 | 6/1998 | Ma | 123/308 |

*Primary Examiner*—Tony M. Argenbright
*Attorney, Agent, or Firm*—Kenneth H. Maclean

[57] ABSTRACT

An internal combustion engine defining a combustion chamber for the direct injection of fuel through a centrally located fuel injector and having a first inlet passage and port for directing hot exhaust gases of a recirculation medium to a central region of the combustion chamber and a second inlet passage and port for directing air tangentially into the combustion chamber to cause a circular flow about the chamber's periphery and about the exhaust rich central region. The injector sprays fuel through the hot exhaust gas medium in the central region which results in a pre-heating of the fuel which has been found to reduce hydrocarbon emissions prior to ignition by a spark plug located adjacent the periphery of the combustion chamber.

6 Claims, 1 Drawing Sheet

COMBUSTION CHAMBER FOR DIRECT INJECTION OF FUEL INTO EXHAUST RECIRCULATION RICH MIXTURE

FIELD OF INVENTION

This invention relates generally to an internal engine and more particularly to a combustion chamber for direct injection of fuel into the combustion chamber through a concentration of exhaust recirculation rich gases selectively introduced through a separate intake for pre-heating fuel before ignition by a radially outward located igniter.

BACKGROUND AND SUMMARY OF THE INVENTION

Directing fuel through an injection into a central portion of a combustion chamber in a spark ignited internal combustion engine is known as per example, in U.S. Pat. No. 5,335,635 to Kadoi and 5,529,038 to Tsuchida. Both of these patents inject fuel into a central region of the combustion chamber. Also, the ignition of fuel by a spark plug located radially outward from the central injection is disclosed in the '038 patent. While an engine will operate successfully with such an arrangement, the emissions of hydrocarbons has been greater than allowed under current standards and requirements.

Hydrocarbon emissions can be reduced by preheating the fuel prior to ignition by a spark plug. The present invention provides a separate intake path for hot exhaust gas recirculation products to direct this hot medium to the central region of the combustion chamber. At an appropriate time in the engine cycle, the centrally located direct fuel injector sprays fuel through the hot medium which results in heating and evaporation of the fuel. The preheated fuel moves radially outward in the combustion chamber to mix with air flowing through a second inlet and together the heated mixture is ignited by a radially outwardly located spark plug.

Other features, objects, and advantages of the invention will become more apparent as the following description proceeds, especially when considered with the accompanying drawings and claims.

DETAILED DESCRIPTION OF THE PREFERRED EMBODIMENT

Figure 1:
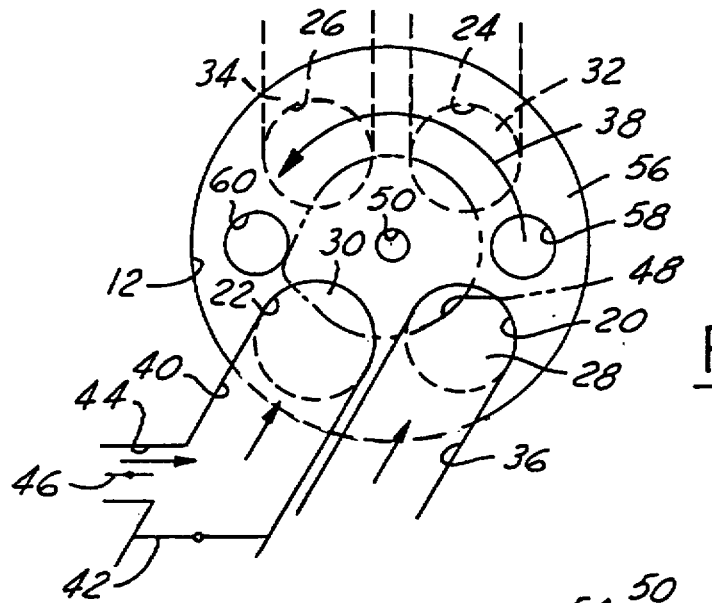
FIG. 1 is a side elevation and sectioned view of the subject combustion chamber showing the central placement of the direct injector and its flow pattern.
Figure 2:
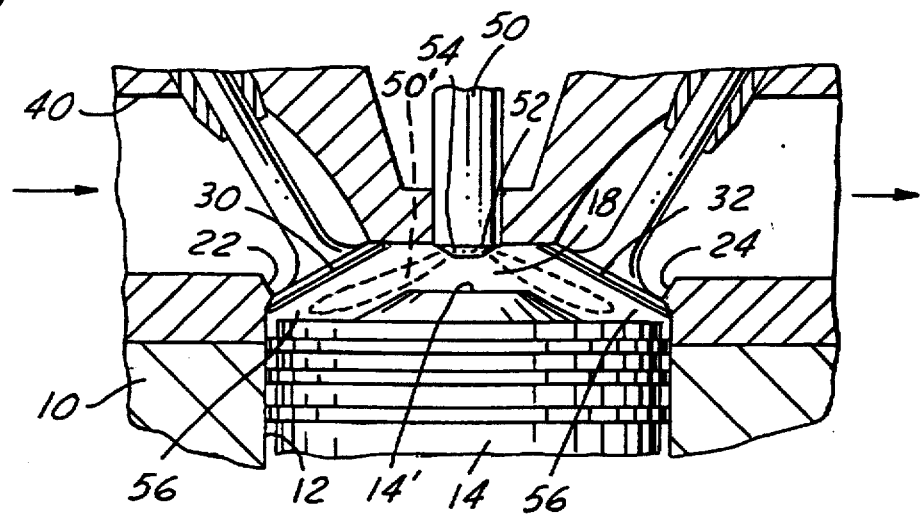
FIG. 2 is a top planar and sectioned view of the combustion chamber showing the location of the injector, spark plugs and the pair of inlets for exhaust gas recirculation gases and for air respectively during a low load engine operation.
Figure 3:
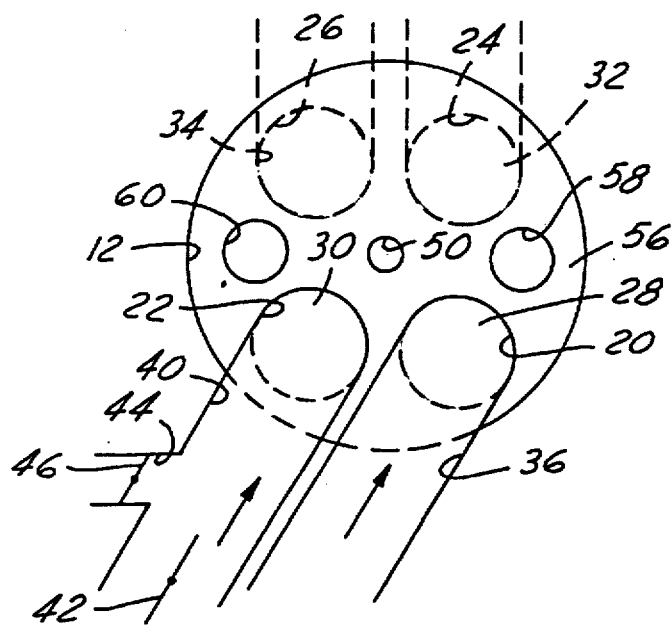
FIG. 3 is a view like in FIG. 2 but showing operational characteristics under higher load and speed conditions.

In FIGS. 1–3, interior portions of an engine's combustion chamber are shown. Specifically, an engine block 10 has a cylinder bore 12 formed therein. A piston 14 is mounted for reciprocation in bore 12 as is common with internal combustion engines.

A cylinder head 16 is attached to the engine block 10 in overlying relation to the piston bore and spaced from the piston in the bore to form a variable volume combustion chamber 1 8. In the subject cylinder head 16, a pair of intake ports 20, 22 are provided to discharge air and exhaust gas recirculation products into the combustion chamber 18. A pair of exhaust ports 24, 26 are provided to receive the combusted product or medium from the combustion chamber 18. Gas flow through the inlet ports 20, 22 and exhaust ports 24, 26 is controlled by opening and closing valves 28, 30, 32, 34 respectively as is common in previous and in current internal combustion engines.

Referring specifically to FIG. 1, one inlet ports 20 is connected to an inlet passage 36 formed in the cylinder head having a flow axis opening in a substantially tangential direction of the combustion chamber 18 so that a circular, swirling flow of air is produced as shown by the arrow 38. The other inlet port 22 is connected to a passage 40 having a flow axis generally aimed toward the middle or central portion of the combustion chamber 18. The passage 40 is connected to a source of atmospheric air which is controlled by a movable throttle blade 42. Passage 40 is also connected to a passage 44 which receives exhaust gas recirculation products. A movable throttle blade 46 controls the flow of exhaust gas received from downstream of the exhaust ports 24, 26.

In FIGS. 1, the throttle blades 42, 46 of the engine are set for operation at low speed and/or light loads. The passage of air through passage 36 produces a circular movement of air around the outer ring of the combustion chamber. The opening of blade 46 combined with the restriction by blade 42 causes the fluid medium directed to the central region of the combustion chamber to be rich in exhaust gases. These exhaust gases are also hot. The central region is identified by the dotted line area labeled by numeral 48.

Referring now to FIG. 2, a fuel injector 50 is located centrally to the combustion chamber and spaced away from a top surface 14' of the piston which may be dome shaped as shown. The fuel injector 50 defines an obliquely surfaced annulus 52 through which a plurality of outlet orifices 54 extend. The surface 52 and orifices 54 are oriented to spray fuel radially outward from the injector 50 towards the peripheral edge portion 56 or circle of swirling air which entered the combustion chamber through inlet port 20. The spray pattern 50' of fuel passes through the hot exhaust gas-rich central region 48 and is heated, therefore attaining a higher temperature and enhancing evaporation of the fuel. The fuel joins the air in the peripheral region 56 and is ignited by at least one, but preferably two, spark plugs 58, 60. Each spark plug is located at the periphery of the combustion chamber and is in fluid contact with the outer edge region 56 where the heated fuel mixes with the swirling air and is selectively ignited.

By preheating the fuel by passing it through the high temperature exhaust gases of the recirculated medium located in the central region of the combustion chamber, the combustion of the fuel/air mixture is more complete, thereby resulting in a decrease in hydrocarbons in the exhaust.

In FIGS. 3, the throttle blades 42, 46 of the engine are set for operation at middle to high speed and/or middle to heavy loads on the engine. The passage of air through both passages 36 and 40 produces a circular movement of air about a generally horizontal axis, otherwise known as tumbling. The restriction by blade 46 causes little exhaust gas to flow into the combustion chamber.

While the above detailed description describes the preferred embodiment of the present invention, the invention is susceptible to modification, variation and alteration without deviating from the scope and fair meaning of the subjoined claims.

What is claimed is:

1. An induction system and combustion chamber for a spark ignited internal combustion engine with direct fuel injector to introduce fuel directly into the combustion chamber, comprising:

the engine combustion chamber having two inlets thereto, a first inlet oriented tending to introduce air tangentially into the combustion chamber to produce a generally circular motion in a peripheral region of the combustion chamber and about a vertical axis, a second inlet oriented to introduce air generally toward the center of the combustion chamber tending to produce a rolling air movement about a horizontal axis;

a source of exhaust gases from the combustion chamber being fluidly connected to said second inlet so that an exhaust gas rich region is produced at the central portion of said combustion chamber;

a fuel injector located centrally of said combustion chamber with fluid outlets to spray fuel generally in a radially outward direction through the exhaust gas rich central region and into the peripheral region of the combustion chamber, whereby fuel is heated by the exhaust gases;

at least one spark igniter located in the peripheral region of the combustion chamber for selectively igniting a mixture of fuel and air in the peripheral region.

2. In a spark ignited type internal combustion engine of the type having a combustion chamber with fuel injector for passing fuel directly into the combustion chamber, a fluid distribution system for passing air and exhaust recirculation gases into the combustion chamber, comprising:

the combustion chamber having two inlets thereto, a first inlet oriented to direct a flow of air in a generally tangential direction into the chamber to produce a circular motion about a generally vertical axis, and a second inlet oriented to direct a flow of air toward a central region of the combustion chamber to produce circular motion about a generally horizontal axis, a source of exhaust gases;

an exhaust gas inlet fluidly connected to said second combustion chamber inlet;

selectively positioned valve means for controlling the quantity of exhaust gases passed into said second inlet to produce an exhaust gas rich central region in said combustion chamber under certain operating conditions;

a fuel injector located centrally of said combustion chamber, said fuel injector having outlets to cause fuel to spray in a substantially radially outward direction toward the periphery of the combustion chamber and through the exhaust gas rich central portion, wherein the fuel is heated by the exhaust gases;

at least one spark igniter located adjacent the periphery of the combustion chamber for selectively igniting the mixture of fuel and air in the outer region of the combustion chamber surrounding the exhaust gas rich central region.

3. The combustion chamber and fluid distribution system for passing air and exhaust recirculation gases into the combustion chamber as set forth in claim 2 in which the valve means controls the ratio of air and exhaust gases passing through said second inlet.

4. The combustion chamber and fluid distribution system for passing air and exhaust recirculation gases into the combustion chamber as set forth in claim 2 in which two spark plugs are positioned adjacent the peripheral edge of the combustion chamber and located generally opposite to one another to either side of the centrally located fuel injector.

5. The combustion chamber and fluid distribution system for passing air and exhaust recirculation gases into the combustion chamber as set forth in claim 2 in which said fuel injector is positioned centrally and in series flow relation to said second inlet.

6. The combustion chamber and fluid distribution system for passing air and exhaust recirculation gases into the combustion chamber as set forth in claim 5 in which said fuel injector has an obliquely inclined annular surface within said combustion chamber through which a plurality of fuel outlet orifices are extended so that fuel is mainly directed radially outward in the combustion chamber through the exhaust gas rich central region.

* * * * *